United States Patent [19]

Stürm et al.

[11] Patent Number: 4,612,468

[45] Date of Patent: Sep. 16, 1986

[54] EXTERNAL ROTOR MOTOR WITH CLAMPED STATOR BUSHING

[75] Inventors: Gerhard Stürm, Mulfingen; Horst Voss, Künzelsau; Wilhelm Reinhardt, 44, Shrozberg; Martin Wagner; Dieter Best, both of Ingelfingen; Reinhold Schumann, Niederstetten, all of Fed. Rep. of Germany

[73] Assignee: ebm Elektrobau Mulfingen GmbH & Co., Fed. Rep. of Germany

[21] Appl. No.: 698,611

[22] Filed: Feb. 6, 1985

[30] Foreign Application Priority Data

Feb. 8, 1984 [DE] Fed. Rep. of Germany ....... 3404466

[51] Int. Cl.4 .............................................. H02K 5/16
[52] U.S. Cl. .................................. 310/67 R; 310/42; 310/89; 310/90
[58] Field of Search .................... 310/42, 43, 67 R, 89, 310/156, 261, 266, 90, 254

[56] References Cited

U.S. PATENT DOCUMENTS

| | | | |
|---|---|---|---|
| 2,416,300 | 2/1947 | Godsey, Jr. | 310/67 R |
| 2,709,228 | 5/1955 | Miller et al. | 310/43 |
| 3,002,118 | 9/1961 | Papst | 310/67 R |
| 3,310,698 | 3/1967 | Krell | 310/42 |
| 4,329,606 | 5/1982 | Montagu | 310/67 R |
| 4,429,245 | 1/1984 | Müller et al. | 310/261 |
| 4,469,972 | 9/1984 | Rampignon et al. | 310/42 |

Primary Examiner—Patrick R. Salce
Assistant Examiner—D. L. Rebsch
Attorney, Agent, or Firm—Goodman & Teitelbaum

[57] ABSTRACT

An external rotor motor, especially for driving fans, including a stationary inside stator, an outside rotor, and a stator-lamination pack of the inside stator having a central bore into which there is installed, with the aid of a clamping seating, a stator bushing which is connected mechanically on one side with the motor flange carrying the external rotor motor. Inside the stator bushing, there is a turnable shaft which is fixedly secured, on the side lying opposite the motor flange, within a rotor bushing of the turnable outside rotor. The motor flange includes on the inside, a hollow cylindrical added piece with an inward-directed annular crosspiece, which abuts against the stator-lamination pack. The stator bushing, installed with the aid of a clamping seating in the central bore of the stator-lamination pack, has an outward-directed annular crosspiece which is seated against the inward-directed annular crosspiece of the cylindrical added piece of the motor flange.

13 Claims, 6 Drawing Figures

EXTERNAL ROTOR MOTOR WITH CLAMPED STATOR BUSHING

BACKGROUND OF THE INVENTION

The present invention relates to an external rotor motor, especially for driving fans, including a stationarily arranged inside stator as well as an outside rotor arranged to turn about the inside stator. The stator-lamination pack of the inside stator is provided with a central bore into which there is installed, with the aid of a clamp seating, a stator bushing which is joined mechanically on one side with the motor flange carrying the external rotor motor. Inside the stator bushing, there is a turnable shaft which is fixedly secured on the side lying opposite the motor flange, within a rotor bushing of the turnable outside rotor.

For the driving of small fans, which are used, for example, for the ventilating of electric tools, frequently external rotor motors are equipped with an inside stator, as well as an outside rotor arranged to turn about this inside stator. The main reason for the use of such external rotor motors in conjunction with small or compact fans is that the fan blades can be provided by welding or pressing a fan wheel onto the rotor, or by pressing a plastic fan wheel provided with a hood onto the rotor, so that the production of the fan is simplified.

In the construction of such external rotor motors, the outside rotor is borne turnably with respect to the stationarily arranged inside stator, for which purpose the stator lamination pack of the inside stator is provided with a central bore through which there is slid a shaft which is fastened on one side to the bell-shaped outside rotor. For the bearing of the rotor shaft inside the bore of the stator lamination pack, there are provided, as a rule, two ball bearings spaced from one another, inside a bearing tube that is pressed into the bore of the stator lamination pack. The bearing tube is used, furthermore, for the establishment of the mechanical connection between the stationary inside stator and an outer motor flange, to provide the mechanical suspension of the external rotor motor.

In view of this additional function of the bearing tube, it is extended into a portion of the motor flange, the face surface of the bearing tube forming a stop surface which lies on the motor flange. The connection between the bearing tube of the inside stator and the lateral rotor flange can occur either with the aid of a single central screw (see German patent No. 21 02 679) or with the aid of several peripherally arranged screws (see German published application AS No. 25 60 207), it being necessary in the first case for the bearing tube to be provided with an inside thread, and in the second case with an outside flange.

From German unexamined patent specification OS No. 32 23 057, there is known a detachable holding arrangement for a bearing. This holding device serves for the reception of the bearing of the shaft. The corresponding part of the casing has a base with a hole for the passage of the shaft. The bearing member, here a ball bearing, is held on the base of the casing part by means of an upset metal plate which grips over the bearing member. For the fastening of the metal plate to the base, there are provided holding projections and centering projections on the base of the casing which interact with corresponding parts of the plate, which on turning, lead to the fastening of the bearing.

SUMMARY OF THE INVENTION

An object of the present invention is to provide a simple, easily assemblable and thereby economical possibility of joining the stator and the motor flange.

According to the present invention, the motor flange includes an inside cylindrical added piece provided with an inward-extending annular crosspiece forming a step, which added piece abuts on the outside of the stator lamination pack, and the stator bushing is installed with the aid of a clamping seating into the central bore of the stator lamination pack, where the stator bushing includes an outward projecting annular crosspiece likewise forming a step, which is seated on the step of the annular crosspiece of the cylindrical added piece of the motor flange.

Furthermore, according to the present invention, the clamp seating, which is provided between the stator lamination pack and the stator bushing and the laterally arranged motor flange, is achieved by the means that the motor flange or a cylindrical added piece applied thereto is fitted with an inward-drawn annular crosspiece, on which is seated an outward-drawn annular crosspiece of the stator bushing in the pressing of the stator bushing into the central bore of the stator lamination pack in a closed linkage.

Since the face surface of the cylindrical added piece of the motor flange abuts laterally outward against the stator lamination pack, there is obtained a very accurate positioning of the stator lamination pack and the stator bushing arranged therein with respect to the motor flange, thus holding the external rotor motor toward the outside, thereby special adjustments thereof are avoided and excellent running properties of the external rotor motor is assured. Since the pressing of the stator bushing into the central bore of the inside stator simultaneously establishes the mechanical connection between the motor flange and the inside stator, there is further obtained a simplication of the assembling thereof.

The use of a motor flange with a cylindrical added piece extending into engagment with the stator-lamination pack, as well as a stator bushing being slidable into this cylindrical added piece with respect to the stator lamination pack, instead of using a bearing tube running through and fastenable directly to the motor flange, brings about, moreover, still another advantage. In external rotor motors of small dimensions, it is important that the windings evoking the magnetization of the stator lamination pack be provided with a large number of turns, which requires a winding space of large volume. This, in turn, makes it necessary for the grooves arranged inside the stator lamination pack to have a radial depth as great as possible. In view of the requisite yoke strength (or thickness) of the stator lamination pack, it is desirable to dimension the diameter of the central bore of the stator lamination pack, which receives the bearing tube or the stator tube, as small as possible. A maintenance-free running of an external rotor motor over several 1,000 operating hours requires, however, that the bearings for the rotor shaft be dimensioned as large as possible. This requirement presents difficulties, especially in the case when ball bearings are used.

In the scope of the present invention, however, these opposing requirements can be very well fulfilled, even in the case when ball bearings are used, because the stator bushing, used in place of a continuous bearing tube, can be dimensioned in such a way that one ball bearing can be accommodated inside the inward-extending cylindrical added piece of the motor flange, while another ball bearing can be arranged inside a special bearing reception part. The outer dimensions of the ball bearings for the rotor shaft, therefore, can be selected substantially independently of the diameter of the bore extending through the stator lamination pack.

BRIEF DESCRIPTION OF THE DRAWINGS

With the above and additional objects and advantages in view, as will hereinafter appear, this invention comprises the devices, combinations and arrangements of parts hereinafter described by way of example, and illustrated in the accompanying drawings of preferred embodiments in which.

In the various figures of the drawings, like reference characters designate like parts.

DETAILED DESCRIPTION OF THE PREFERRED EMBODIMENTS

Figure 1:
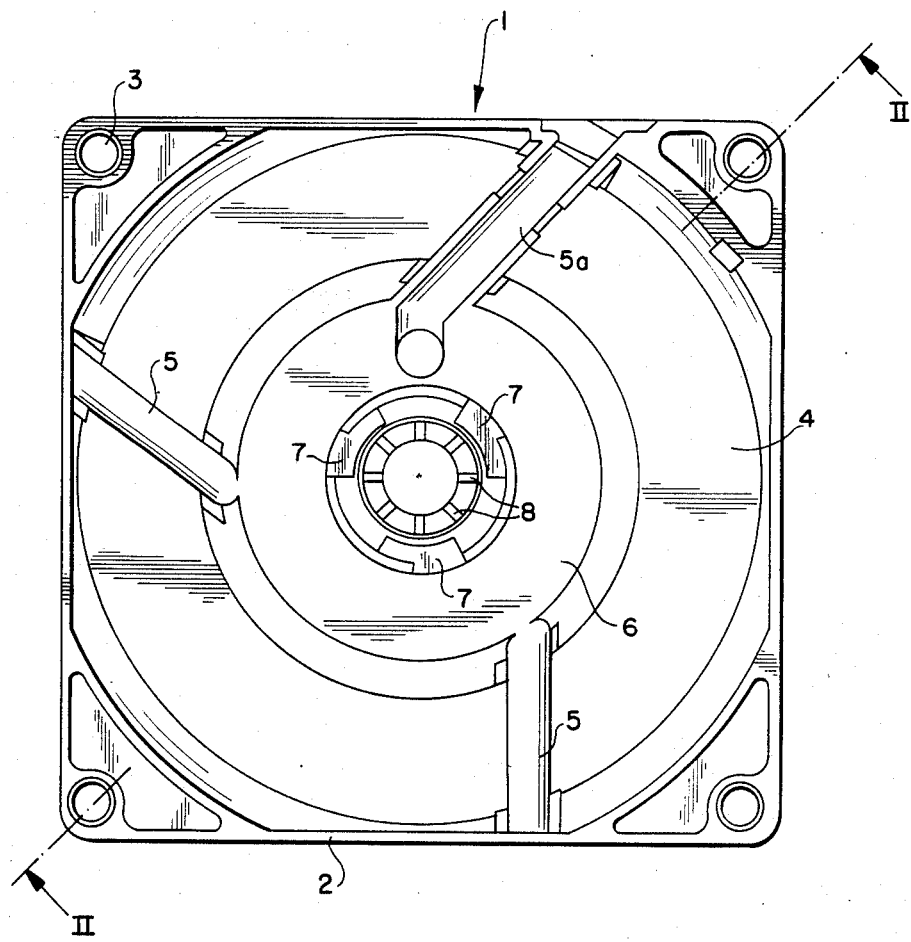
FIG. 1 shows a plan view of the casing of a compact fan.
Figure 2:
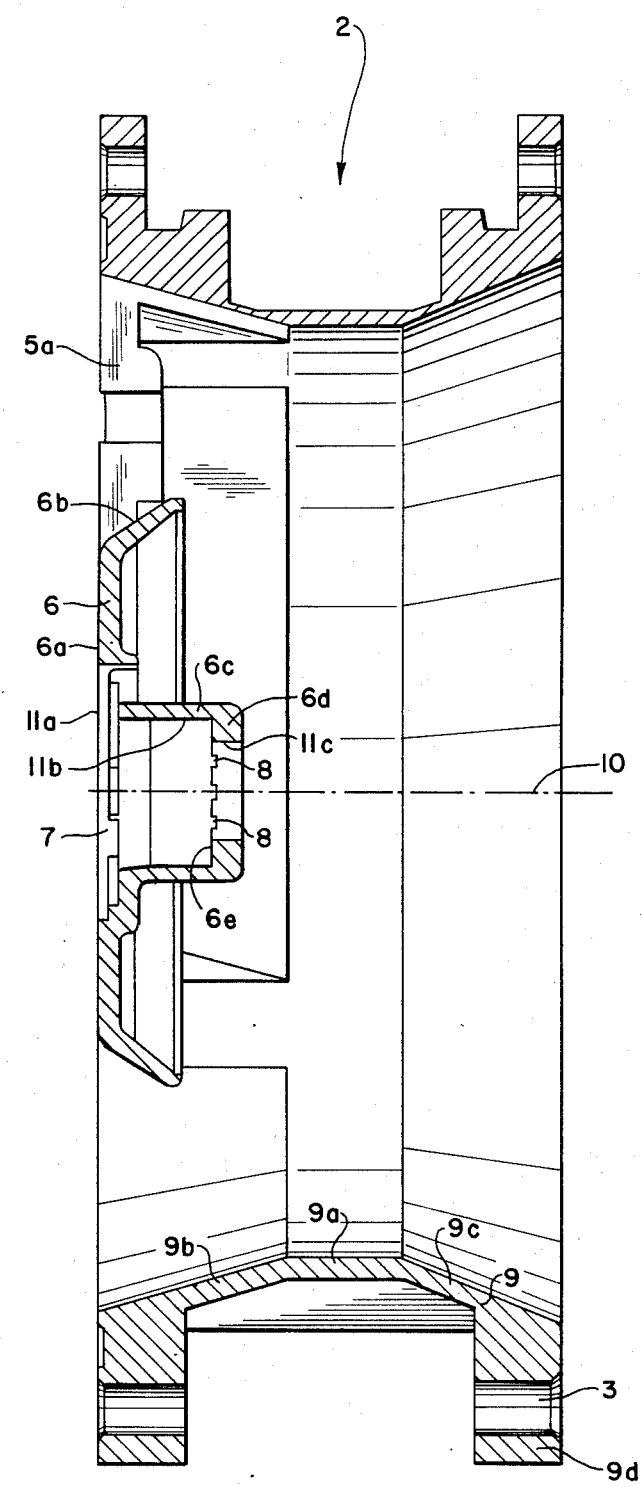
FIG. 2 shows a cross sectional view taken along line II—II of FIG. 1.

Referring now to the drawings, the rectangular, frametype casing 2 of the compact fan is provided, according to FIGS. 1 and 2, with bores 3 in each of the four corners, which serve for the fastening of the compact fan 1, for example, inside an electrical apparatus to be cooled. The casing 2 forms an air channel 4 of substantially circular annular form, the outside diameter of which is chosen somewhat smaller than the width or height of the casing 2.

From the border portion of the casing 2, there extend three struts 5 which are offset in each case by 120° with respect to one another obliquely into the air channel 4. The struts 5 support a circular motor flange 6. The casing 2, the struts 5 and the motor flange 6 are constructed in one integral piece. One of the three struts, strut 5a, is somewhat thicker and U-shaped, so that an electric cable for the feed of the external rotor motor can be carried in this strut 5a. With the aid of a circular disk-shaped outer boundary on the motor flange 6 forming one side of the casing 2, the air channel 4 is bounded toward the center, it being penetrated only by the three obliquely running struts 5.

In the outside base surface of the motor flange 6, bayonet lock crosspieces 7 are arranged around a central opening, being offset against each other in each case by 120°. There can be installed into these crosspieces 7, in a manner known per se, still to be described below, a closure cover with corresponding counter-rest crosspieces. FIG. 1 shows, further, eight radially running grooves 8 offset against one another in each case by 45°, the significance of which will likewise be described below.

In FIG. 2, it is recognizable that the casing 2 of the compact fan 1 is formed essentially by a wall ring 9, which includes a cylindrical middle annular portion 9a as well as two lateral annular portions 9b and 9c which extend outwardly therefrom in opposite directions so that the ring 9 widens outwardly. The two lateral annular portions 9b and 9c are provided with flaps 9d at each of the corners of the casing through which there are provided the bores 3 serving for the fastening of the compact fan 1. These bores 3 run parallel to the central axis 10 of the compact fan (blower) 1.

According to FIG. 2, the motor flange 6, which is supported by the three struts 5, has a plate-type base 6a, onto which there is formed, in one integral piece, an obliquely inward-directed border 6b. The motor flange 6 is held by the three struts 5 inside the casing 2 in such a way that the outer face surface of the plate-type base 6a is aligned with the front face surface of the wall ring 9. On the base 6a of the motor flange 6, there is arranged a hollow cylindrical added piece 6c, the axis of which coincides with the central axis 10. The added piece 6c extends into the casing 2 and forms an opening 11c. The added piece 6a has on its free end an annular crosspiece 6d extending towards the axis 10. The grooves 8, distributed evenly as shown in FIG. 1, are provided on the engagement surface 6e of the annular crosspiece 6d, which is radially aligned inside the cylindrical added piece 6c. The base 6a of the motor flange 6 includes a round opening 11a that corresponds to the diameter of the hollow space 11b of the added piece 6c. The opening 11a going through the plateform base 6a of the motor flange 6 provides preferably, however, a larger diameter than the hollow space 11b.

Figure 3B:
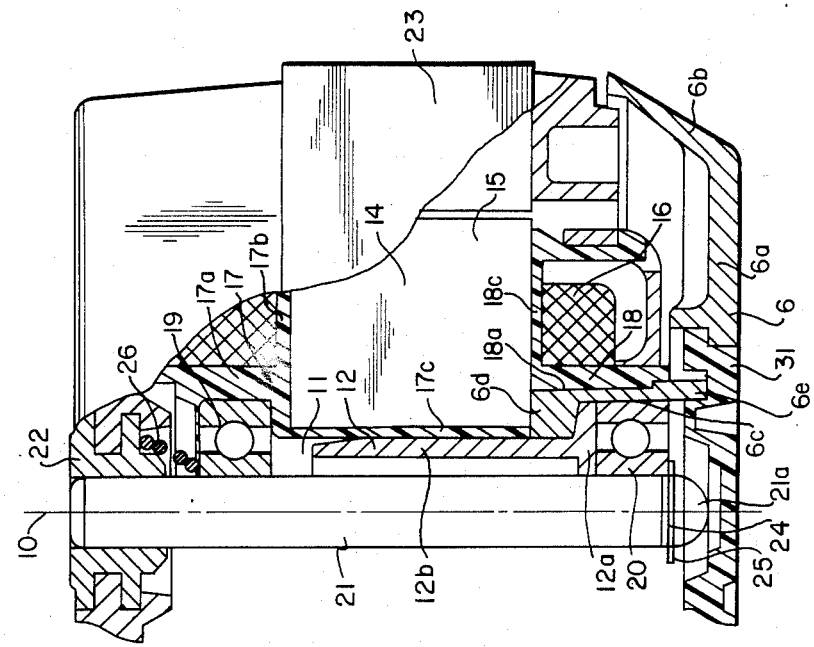
FIG. 3b shows a side view of the other side of the external rotor motor partly in section, provided with a second embodiment of the stator bushing.
Figure 3A:
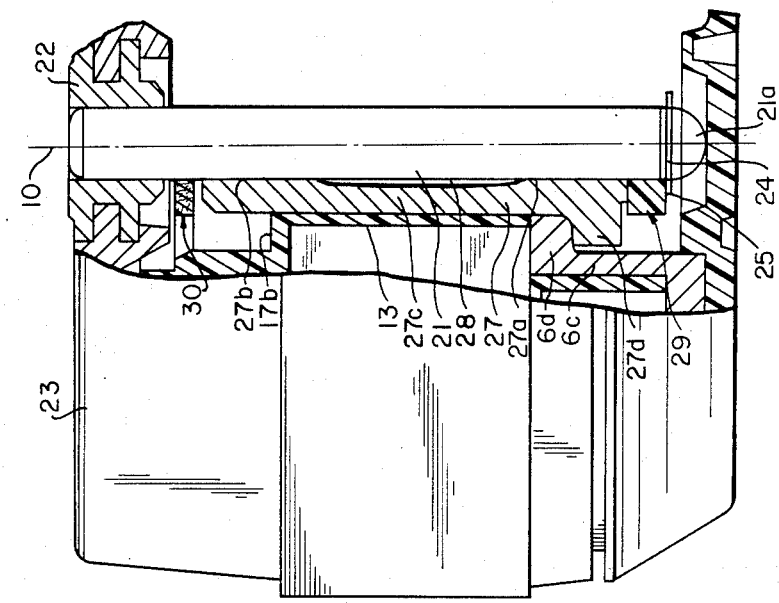
FIG. 3a shows a side view of one side of the external rotor motor, partly in section, provided with one embodiment of the stator bushing.

The external rotor motor of the present invention is fastened, according to FIGS. 3a and 3b, to the motor flange 6. For this purpose, as shown in FIG. 3a, a stator bushing 12b includes a radially outward-extending annular crosspiece 12a, which is seated in closed form in the hollow space 11b on the annular crosspiece 6d of the cylindrical added piece 6c of the motor flange 6. The cylinder wall 12 of the stator bushing 12b is force-fit through the opening 11c of the added piece 6c and is inserted in closed form and in closed linkage in the central bore 13 (numbered in FIG. 3b) of the stator lamination pack 14. This stator-lamination pack 14 provides the magnetic core of a stationarily arranged inside stator 15, which in addition to the stator-lamination pack 14, is also provided with a stator winding 16 only schematically indicated. This stator winding 16 is held by receiving parts 17 and 18 made of a suitable plastic material, which sit on both sides on the stator-lamination pack 14.

The receiving part 17, on the side opposite the motor flange 6, is provided with a hollow cylindrical axially extending added piece or annular collar 17a, which preferably has a greater diameter than the stator-lamination bore 13. The collar 17a carries on the outside thereof the stator winding 16, and in the interior thereof carries the outer ring of a ball bearing 19 lying against the support surface 17d (numbered in FIG. 3b). Adjacent the stator-lamination pack 14, the cylindrical added piece 17a of the receiving part 17 extends into a washer-shaped portion 17b directed radially outward, which lies against the stator-lamination pack 14 and supports the stator winding 16. On this washer-shaped portion 17b, there is placed, according to one form of the present invention, a shell 17c which lies against the inner surface of the central bore 13 extending through the stator-lamination pack 14. This shell 17c of relatively slight wall thickness brings about, for example, a damping of vibrations and prevents, in the case of friction bearing, a penetration of oil into the stator-lamination pack 14 by reason of the capillary effect.

The receiving part 18, arranged on the opposite side of the receiving part 17, likewise includes a hollow cylindrical, axially aligned added piece or annular collar 18a, on the outside of which is stator winding 16. The mantle surface of the cylindrical added piece of the cylindrical added pieces 18a of the receiving part 18. The cylindrical added piece 18a of the receiving part 18 extends likewise into a washer-shaped portion 18c, which lies against the stator-lamination pack 14. The washer-shaped portion 18c serves, just as does the portion 17b, also as a supporting surface for the stator winding 16, extending in the same direction as the stator-lamination pack 14.

The disk-like wall 18c ends, in a radial inward direction, on the bearing receiving part 18. Thereby, there is formed between the insulating lining 17c of the inner bore 13 of the stator-lamination pack 14 and the disk-like wall 18c, a circular ring free of insulating material on the face side of the stator-lamination pack 14.

In the cylindrical space enclosed by the bearing receiving part 18, there is thrust as a counterpart the likewise cylindrical part 6c until the face side of part 6d lies against the above mentioned circular ring free of insulating material on the stator-lamination pack 14, the part 6c being a one integral piece component with the motor flange 6.

The motor flange 6 serves as a support for the motor in fastening same to the place of use, as well as for covering the stator side. Thus the motor, for example in use as a pure drive motor, is fastened to the motor flange 6, by means of screws, or in the case of use as a ventilator motor, it is joined by the struts 5 fastened to the motor flange 6 (FIG. 1) with the wall ring 9 surrounding it. There, the outer mantle of the cylindrical part 6c lies in closed form on the inner mantle of the bearing receiving part 18.

For security against any twisting of the motor flange 6 with respect to the stator 15, there is provided on the inner surface of the bearer receiving part 18 a lug (not represented), which engages into a correspondingly shaped opening on the outer surface of the cylindrical part 6c of the motor flange 6. Through the lying of the face-side surface of the cylindrical part 6c on the ring free of insulating material on the stator-lamination pack 14, there occurs in operation a lead-off of the heat arising from the motor. It is led off over the motor flange 6 or, in the case of copact fans, over the struts 5 which are connected with the motor flange 6 (FIG. 1) to the environment.

The stator bushing 12 is slid with its annular crosspiece 12a into the cylindrical added piece 6c of the motor flange 6 until the outward-directed annular crosspiece 12a of the stator bushing 12 abuts on the inwardextending annular cross-piece 6d of the motor flange 6. The surfaces which are lying on one another, the annular crosspieces 6d and 12a of the motor flange 6 and of the stator bushing 12, respectively, are slightly bevelled, so that in the pressing of the stator bushing 12 into the cylindrical added piece 6c of the motor flange 6, there comes about a better centering of these two elements 6 and 12.

Inside the cylindrical added piece 6c of the motor flange 6, there is additionally borne a second ball bearing 20, in which the outer ring of this ball bearing 20 lies against the inner shell of the cylindrical added piece 6c.

The outer ring of the ball bearing 20 also abuts laterally against the front face surface of the annular crosspiece 12a of the stator bushing 12. The inner ring of the ball bearing 20 is held by a snap ring 25 borne in a groove 24 of the shaft 21.

With the aid of the two ball bearings 19 and 20, there is borne the rotor shaft 21, the axis of which coincides with the central axis 10 of the external rotor motor. The rotor shaft 12 is pressed on one end into a rotor bushing 22 which is cast into the rotor base, which bushing 22 is seated in the base of, say, a bell-shaped external rotor casing 23.

On the external rotor casing 23, there can be arranged fan blades (not represented).

The rotor shaft 21 includes, in the end portion lying opposite the rotor bushing 22, the annular groove 24, in which there is installed the safety ring 25. With the aid of this safety ring 25, the inner ring of the ball bearing 20 is held in place. In order to avoid any axial play of the rotor shaft 21, there can be provided, for example, a conical spiral spring 26 about the shaft 21. One end of the spring 26 abuts on the rotor bushing 22 and the other end of the spring 26 presses against the inner ring of the ball bearing 19.

According to another embodiment of the present invention, instead of the two ball bearings 19, 20, there is provided a bearing of the outside rotor 23 with the aid of a friction bearing. Accordingly, instead of the relatively thin-walled stator bushing 12 forming a gap between shaft 21 and the stator bushing 12, and instead of the two ball bearings 19, 20 as well as the conical spiral spring 26, there is provided a thicker and longer-dimensioned friction bearing of sinter material defined by a stator bushing 27, as shown in FIG. 3b. The two ends 27a and 27b of the stator bushing 27 are seated with their inner mantle surfaces on the rotor shaft 21. The friction bearing includes a sinter material saturated with a lubricant provided in the intermediate portion 27c disposed between the friction bearing surfaces 27a and 27b. The intermediate portion 27c is slightly larger in its inside diameter than the outside diameter of the rotor shaft 21, so that there is provided a narrow annular gap 28. This intermediate portion 27c serves as a lubricant reservoir for the friction bearing, so that during operation, lubricants are given off from the intermediate portion 27c to the running surfaces 27a and 27b, and thus flow between the friction bearing and the shaft 21.

The stator bushing 27 is likewise fitted with an outward-extending annular crosspiece 27d. After the pressing of the stator bushing 27 into the cylindrical added piece 6c of the motor flange 6, the crosspiece 27d comes to lie against the inward-extending annular crosspiece 6d of the cylindrical added piece 6c. The width of the annular crosspiece 27d is greater than that of the above mentioned annular crosspiece 12a. Thus, between the face surface of the stator bushing 27 and the security ring 25, there is provided a sufficient space to accommodate the starting disk 29. Instead of the above mentioned conical spiral spring 26, there is provided a felt disk 30 between the rotor bushing 22 and the face surface of the stator bushing 27 so that the felt disk 30 is overhanging the bore 13.

Figure 4:
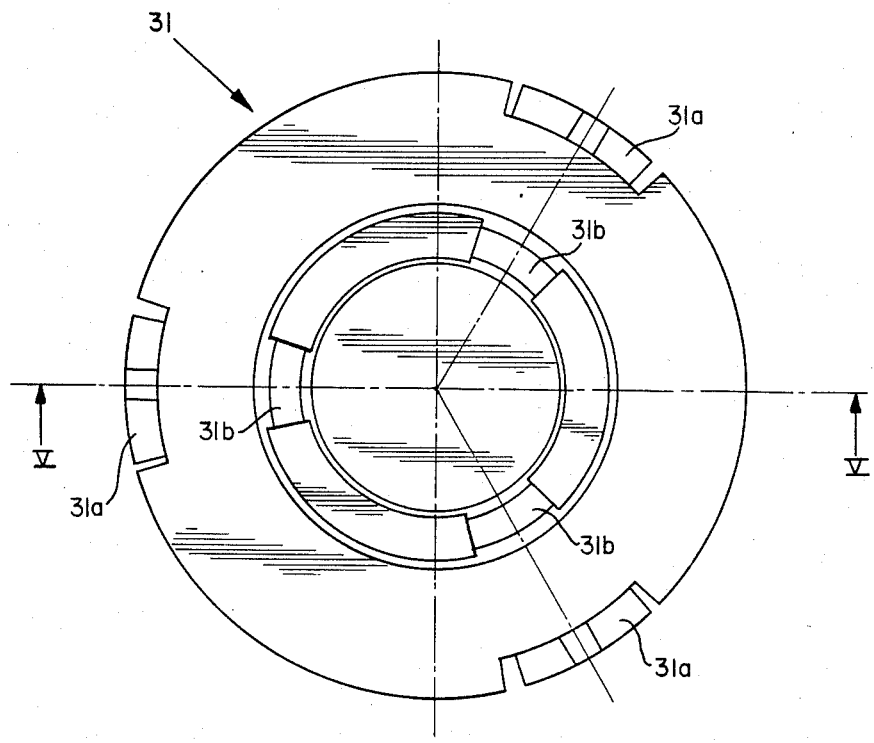
FIG. 4 shows a plan view of the closing cover used for the closure of the rotor flange.
Figure 5:
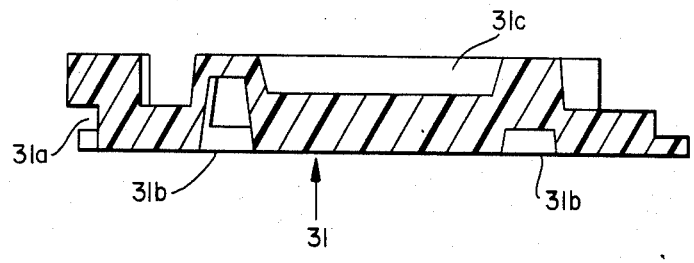
FIG. 5 shows a cross sectional view taken along line V—V of FIG. 4.

According to a special form of the present invention, the external rotor motor includes a closing cover 31, with which the opening 11a in the bottom of the motor flange 6 can be closed after the assembling of the external rotor motor of the present invention. According to FIGS. 4 and 5, this round closing cover 31 has in its peripheral portion, three bayonet lock elements 31a, being offset in each case through 120° with respect to one another, which with the bayonet lock crosspieces 7, represented in FIG. 1, of the motor flange 6 provide a bayonet lock known per se. Toward the middle of the closing cover 31, on the outside on an annular zone, an additional three openings 31b are provided, being offset from one another in each case through 120°. The projections of a tool (not represented) are insertable into the openings 31b so that the tool can guide the closing cover 31 into the opening 11a to provide the bayonet closure, thus there comes about a permanent locking of the closing cover 31 with respect to the motor flange 6.

On the inner surface, the closing cover 31 has in the middle portion a circular depression 31c. In the case of the bearing of the outside rotor 23 on ball bearings 19 and 20, as shown in FIG. 3a, the rounded front end 21a of the shaft 21 extends into the depression 31c. The depression 31c is further recessed so that the shaft end 21a is free of contact.

However, in the case of the bearing of the outside rotor 23 within the friction bearings 27a and 27b, as shown in FIG. 3b, the depth of the circular depression 31c of the closing cover 31 is chosen in such a way that the rounded front end 21a of the rotor shaft 21 abuts against the inner surface to the closing cover 31, thus providing a ball track bearing, so that in this way, there is provided an additional axial counterbearing for the rotor shaft 21. In this latter case, the closing cover 31 is preferably fabricated from a highly abrasion-proof plastic material, for example Nylatron.

The assembling of the external rotor motor of the present invention is very simple, because all the parts that are used for the assembly need simply to be thrust into one another and/or put together.

By the engagement of the outward-extending annular crosspiece 12a of the stator bushing 12 with the inward-extending annular crosspiece 6d of the motor flange 6, there is obtained a mechanical connection between the motor flange and the stator bushing 12, in which the added piece 6c is secured in a closed form in the receiving part 18.

In order to make it possible to establish, as permanent as possible, a mechanical connection between the cylindrical added piece 6c of the motor flange 6 and the stator bushing 12 or 27, respectively, thus forming an extension from the added piece 6c, the scope of the present invention provides that the grooves 8, represented in FIGS. 1 and 2 as running in radial directions, are filled with a suitable adhesive, for example Locktide. The adhesive is also applied between the contact surfaces. Therefore, after the pressing of the stator bushing 12 or 27, respectively, into the shell 17c, an unreleasable mechanical connection is provided between the annular crosspieces 6d and 12a or 27d, respectively. Expediently, there can be provided on the contact surface of the annular crosspiece 12, additional crosspieces (not shown) formed in corresponding structure to the grooves 8, so that they can engage in a closed form into the grooves 8.

The two coil receptacles 17 and 18 are preferably fabricated from an electrical insulating material, such as Ultramid, so that the two receiving parts 17 and 18 provide the required electrical insulation between the stator-lamination pack 14 and the stator winding 16. The production of the receiving parts 17 and 18 occurs preferably in one operation, by spraying the material thereof about the stator lamination pack 16, in which process simultaneously is produced the shell 17c which is to be extended into the central bore 11. The washer-shaped portions 17b and 18c are mechanically joined to the receptacles 17 and 18, respectively, namely, in the form of a plastic layer disposed inside the stator grooves, which serves for the insulation of the winding with respect to the stator-lamination pack. The surfaces between stator bushing 12 or 27 and insulating coating 17c can preferably be provided with an adhesive, in order to achieve an especially secured joining of these parts.

The fastening of the two ball bearings 19 and 20 to the bearing receptacles 17 and 18 occurs preferably by a pressing-in securement. Thereupon, there is carried out the mounting of the rotor, i.e., the rotor is thrust onto the stator, in which process the shaft engages into the inner bore of the stator-lamination pack. Between the shaft and the inner ring of the ball bearing, there is provided a sliding seat. The fixing of the rotor shaft occurs on the same side as the motor flange, by means of the security (snap) ring, which is fastened in the annular groove of the shaft 21.

For the axial bracing of the ball bearing, a conical spring 26 is arranged on the rotor side of the stator (i.e., on the same side of the stator on which the rotor base is present) between the face side (facing the rotor base) of the inner ring of the ball bearing 19 and the rotor, which also provides for the damping of axial vibrations. The conical spring can, however, also be replaced by plate springs.

In the other case where the motor is in a friction bearing, the friction bearing 27 replaces and provides the function of the above mentioned stator bushing 12. Here, the friction bearing 27 is pressed directly into the sprayed stator-lamination pack, which has been sprayed with the insulating material, that the collar 27d of the friction bearing 27 lies, under pressure, on the annular crosspiece 6d of the cylindrical extension 6c of the motor flange 6. Here, too, the same procedure is now followed preferably which corresponds to the above mentioned ball bearing execution, where the connection between collar 27d of the friction bearing 27 and the annular crosspiece 6d is secured by gluing.

After the latter assembling of the rotor and the stator, there now occurs the axial fixing of the shaft, likewise with a security ring 25 fastened in an annular groove 24 of the shaft. Between the security ring 25 and the friction bearing 27, there is installed a starting disk 29, which prevents the axial play of the shaft, and also contributes to the damping of vibrations.

Numerous alterations of the structure herein disclosed will suggest themselves to those skilled in the art. However, it is to be understood that the present disclosure relates to preferred embodiments of the invention which are for purposes of illustration only and are not to be construed as a limitation of the invention.

What is claimed is:

1. An external rotor motor especially for driving fans, comprising:
   a stationary inside stator including a stator-lamination pack provided with a central bore having a central axis;
   an outside rotor arranged to turn about said inside stator, said outside rotor being provided with a rotor bushing on one side of said stator-lamination pack, a shaft being fixedly secured within said rotor bushing, said shaft extending into said central bore and being rotatably disposed coaxially to said central axis;

a motor flange for carrying said external rotor motor, said motor flange being disposed on an opposite side of said stator-lamination pack;

said motor flange including a cylindrical added piece extending inwardly toward said stator-lamination pack, said cylindrical added piece surrounding a portion of said shaft and being disposed coaxially to said central axis;

said cylindrical added piece being provided with a first annular crosspiece at an inwardly disposed free end thereof, said first annular crosspiece extending radially toward said shaft to define a first rim portion;

an inwardly facing surface of said first rim portion being disposed against said stator-lamination pack;

a stator bushing having an inwardly disposed portion clampingly seated within said central bore with said shaft extending through said stator bushing, said stator bushing being disposed coaxially to said central axis;

an outward disposed portion of said stator bushing being disposed within said first rim portion, said outward disposed portion being provided with a second annular crosspiece at an outwardly disposed free end of said stator bushing, said second annular crosspiece extending radially away from said shaft toward said cylindrical added piece to define a second rim portion; and said second rim portion of said stator bushing being seated against an outwardly facing surface of said first rim portion of said cylindrical added piece of said motor flange to sandwich said first rim portion between said second rim portion and said stator-lamination pack for mechanically joining said motor flange to said stator bushing and said stator-lamination pack;

whereby any heat produced by said stator is carried off by said cylindrical added piece to an outside surface of said motor flange and then to surrounding environment.

2. In an external rotor motor, especially for driving fans, including a stationarily arranged inside stator as well as an outside rotor arranged to turn about the inside stator, a stator-lamination pack of the inside stator being provided with a central bore into which, with aid of a clamping seating, there is installed a stator bushing which is joined mechanically on one side with a motor flange carrying the external rotor motor, inside the stator bushing there being arranged a turnable shaft, the shaft being fixedly secured, on a side lying opposite the motor flange, within a rotor bushing of the turnable outside rotor, an improvement comprising:

said motor flange including, on an inner side, a cylindrical added piece provided with an inwardly extending annular crosspiece defining a first step, said added piece being disposed with an outside surface against said stator-lamination pack;

said stator bushing including an outwardly extending annular crosspiece defining a second step, said second step of said stator bushing being seated against said first step of said cylindrical added piece of said motor flange; and said annular crosspiece of said cylindrical added piece of said motor flange being provided, on an inner side, with radially running grooves which serve for reception of a hardenable adhesive.

3. In an external rotor motor, especially for driving fans, including a stationarily arranged inside stator as well as an outside rotor arranged to turn about the inside stator, a stator-lamination pack of the inside stator being provided with a central bore into which, with aid of a clamping seating, there is installed a stator bushing which is joined mechanically on one side with a motor flange carrying the external rotor motor, inside the stator bushing there being arranged a turnable shaft, the shaft being fixedly secured, on a side lying opposite the motor flange, within a rotor bushing of the turnable outside rotor, an improvement comprising:

said motor flange including, on an inner side, a cylindrical added piece provided with an inwardly extending annular crosspiece defining a first step, said added piece being disposed with an outside surface against said stator-lamination pack;

said stator bushing including an outwardly extending annular crosspiece defining a second step, said second step of said stator bushing being seated against said first step of said cylindrical added piece of said motor flange; and said motor flange being provided, in a middle portion, with a circular opening, said circular opening being closable with a closing cover having a bayonet lock arrangement.

4. An external rotor motor according to claim 3, wherein an end of said shaft includes a rounded face surface providing a ball track bearing for engagement on an inner surface of said closing cover.

5. An external rotor motor according to claim 1, wherein an end of said shaft is provided with an annular groove into which there is installed a security ring.

6. An external rotor motor according to claim 1, wherein on an inner side of said bore of said stator-lamination pack receiving said stator bushing, there is arranged a shell of insulating material disposed between said stator bushing and said bore.

7. An external rotor motor according to claim 1, wherein on opposite sides of said stator-lamination pack there is provided in each case a ball bearing, an outer ring of one ball bearing being arranged inside said cylindrical added piece of said motor flange, and an outer ring of the other ball bearing being arranged in a correspondingly formed receiving part disposed on said stator-lamination pack.

8. In an external rotor motor, especially for driving fans, including a stationarily arranged inside stator as well as an outside rotor arranged to turn about the inside stator, a stator-lamination pack of the inside stator being provided with a central bore into which, with aid of a clamping seating, there is installed a stator bushing which is joined mechanically on one side with a motor flange carrying the external rotor motor, inside the stator bushing there being arranged a turnable shaft, the shaft being fixedly secured, on a side lying opposite the motor flange, within a rotor bushing of the turnable outside rotor, an improvement comprising:

said motor flange including, on an inner side, a cylindrical added piece provided with an inwardly extending annular crosspiece defining a first step, said added piece being disposed with an outside surface against said stator-lamination pack;

said stator bushing including an outwardly extending annular crosspiece defining a second step, said second step of said stator bushing being seated against said first step of said cylindrical added piece of said motor flange;

on opposite sides of said stator-lamination pack there being provided in each case a ball bearing, an outer ring of one ball bearing being arranged inside said cylindrical added piece of said motor flange, and an outer ring of the other ball bearing being arranged in a correspondingly formed receiving part disposed on said stator-lamination pack; and said receiving part receiving said other ball bearing and a shell of insulating material being constructed in one piece, said shell being disposed between said stator bushing and said bore.

9. In an external rotor motor, especially for driving fans, including a stationarily arranged inside stator as well as an outside rotor arranged to turn about the inside stator, a stator-lamination pack of the inside stator being provided with a central bore into which, with aid of a clamping seating, there is installed a stator bushing which is joined mechanically on one side with a motor flange carrying the external rotor motor, inside the stator bushing there being arranged a turnables shaft, the shaft being fixedly secured, on a side lying opposite the motor flange, within a rotor bushing of the turnable outside rotor, an improvement comprising:

said motor flange including, on an inner side, a cylindrical added piece provided with an inwardly extending annular crosspiece defining a first step, said added piece being disposed with an outside surface against said stator-lamination pack;

said stator bushing including an outwardly extending annular crosspiece defining a second step, said second step of said stator bushing being seated against said first step of said cylindrical added piece of said motor flange;

on opposite sides of said stator-lamination pack there being provided in each case a ball bearing, an outer ring of one ball bearing being arranged inside said cylindrical added piece of said motor flange, and an outer ring of the other ball bearing being arranged in a correspondingly formed receiving part disposed on said stator-lamination pack;

an inner ring of said one ball bearing being disposed on a security ring secured to said shaft; and one end of a spring pressing on an inner ring of said other ball bearing, with the other end of said spring abutting on said rotor bushing, said spring being a conical spiral spring.

10. An external rotor motor according to claim 1, wherein said stator bushing extends entirely through said stator-lamination pack, opposite ends of said stator bushing providing two spaced apart friction bearings with respect to said shaft.

11. An external rotor motor according to claim 1, wherein said stator bushing extends entirely through said stator-lamination pack, said stator bushing being constructed as a one-piece friction bearing, said shaft being guided by opposite two ends of said friction bearing.

12. An external rotor motor according to claim 5, wherein a starting disk is disposed between said security ring and said second annular crosspiece of said stator bushing, and a felt disk is disposed between said rotor bushing and an opposite end of said stator bushing.

13. An external rotor motor according to claim 1, wherein a wall ring is connected by struts to said motor flange, said wall ring providing a casing for said external rotor motor.

* * * * *